Oct. 8, 1940.   E. J. PAQUE   2,216,828
POWER DRIVEN HACK SAW
Filed Dec. 2, 1937   4 Sheets-Sheet 1

INVENTOR.
BY Edward J. Paque
Wood & Wood ATTORNEYS

Oct. 8, 1940.  E. J. PAQUE  2,216,828

POWER DRIVEN HACK SAW

Filed Dec. 2, 1937  4 Sheets-Sheet 2

INVENTOR.
BY Edward J. Paque
Wood & Wood
ATTORNEYS

Oct. 8, 1940.  E. J. PAQUE  2,216,828
POWER DRIVEN HACK SAW
Filed Dec. 2, 1937  4 Sheets-Sheet 3
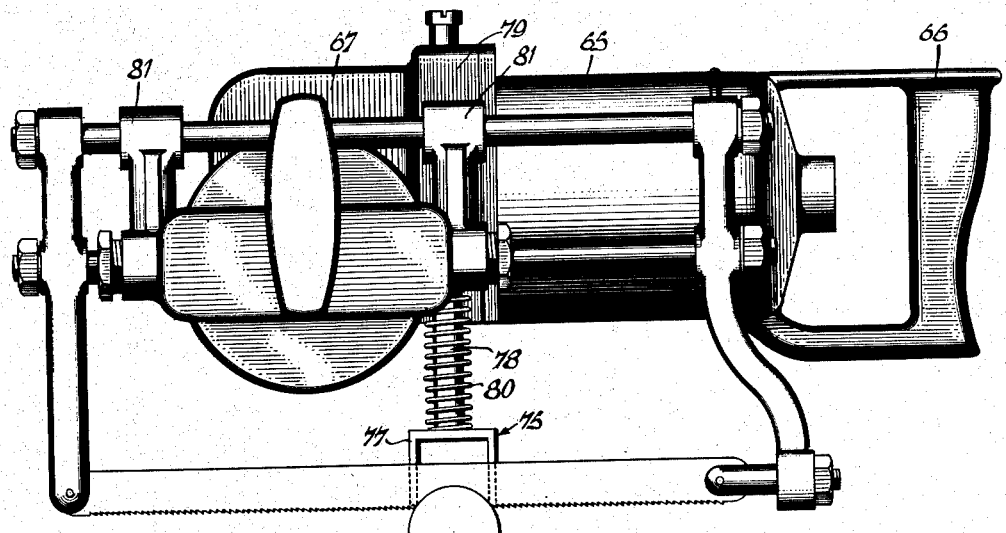
Fig. 9
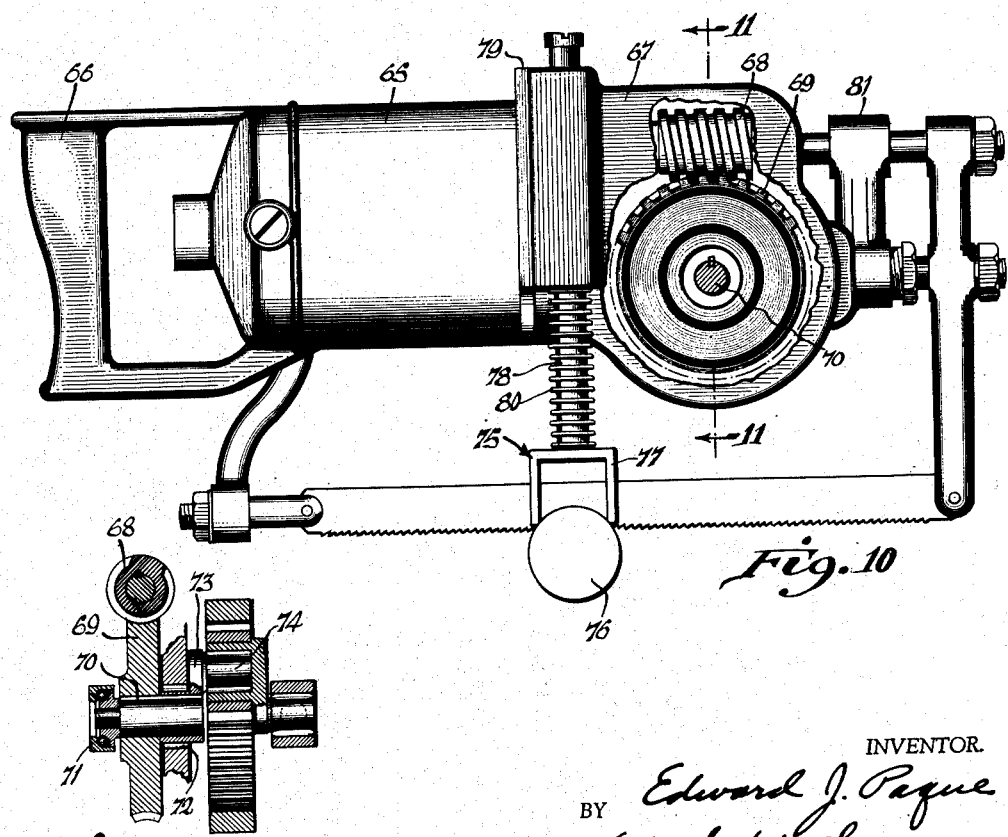
Fig. 10
Fig. 11
INVENTOR.
Edward J. Paque
BY Wood & Wood
ATTORNEYS Oct. 8, 1940.  E. J. PAQUE  2,216,828
POWER DRIVEN HACK SAW
Filed Dec. 2, 1937  4 Sheets—Sheet 4
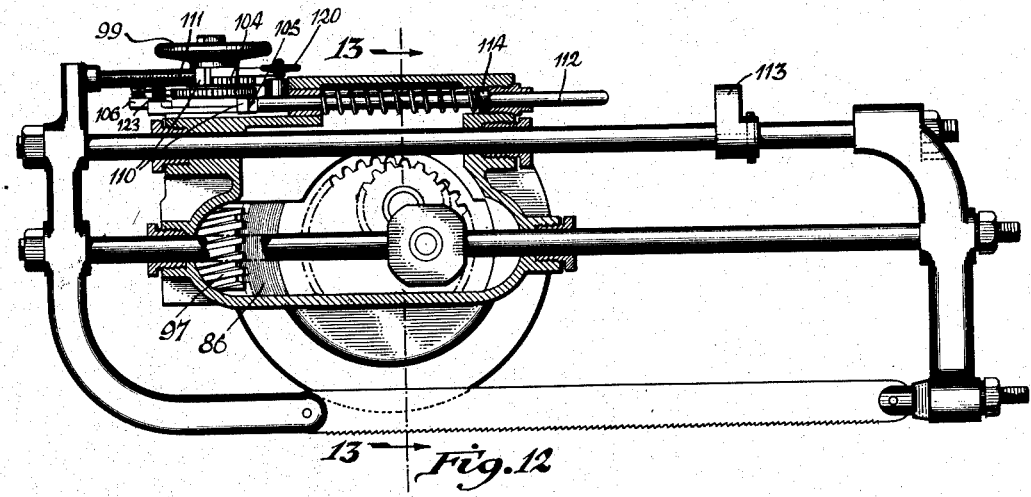
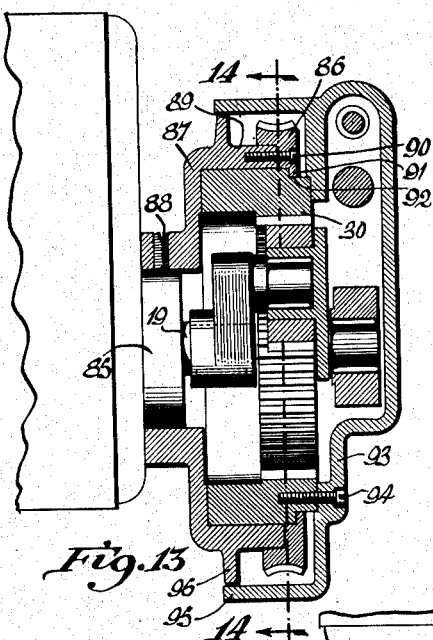
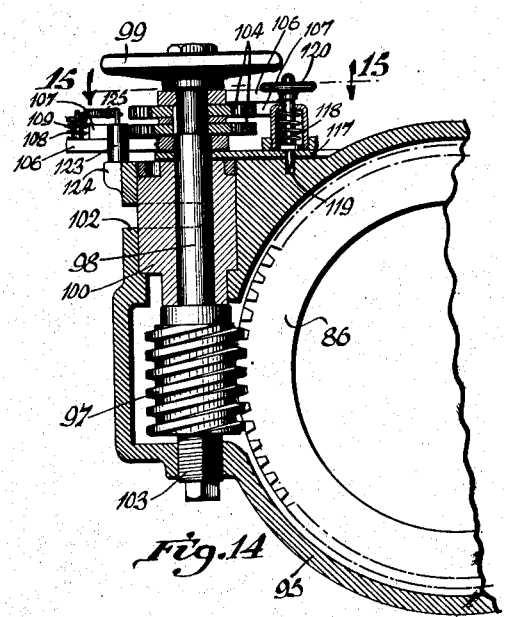
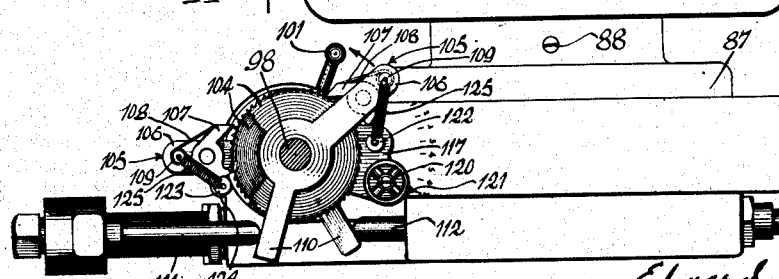
INVENTOR.
Edward J. Paque
BY Wood & Wood ATTORNEYS Patented Oct. 8, 1940

2,216,828

UNITED STATES PATENT OFFICE 2,216,828

POWER DRIVEN HACK SAW

Edward J. Paque, Cincinnati, Ohio

Application December 2, 1937, Serial No. 177,764

11 Claims. (Cl. 29—73)

This invention relates to improvements in power driven, reciprocating hack saws of the type commonly used in machine shops for cutting metals or other hard materials. The invention is also useful for operating files. More specifically, the invention is directed to a power driven hack saw incorporating a driving motor and a novel reciprocating mechanism mounted directly upon the motor and making up a unitary hack saw assembly.

Power driven hack saws are used commonly in machine shops and other manufacturing plants, particularly where metal or other hard cutting is encountered. These machines ordinarily are mounted on a heavy base and constitute rather intricate mechanisms. Consequently they are cumbersome and heavy in weight and require a considerable amount of floor space. In other words, it has been the general practice to design power driven hack saws along lines similar to other heavy machine tools, which necessitate a permanent installation on the floor of the shop. This has often been disadvantageous to the men whose workbenches are located some distance away from the machine.

The present invention is embodied in a compact, self contained unit which is simple and relatively inexpensive to manufacture and which takes up very little space. Moreover, the structure is light in weight because of the reduced number of parts and the absence of heavy mechanism and, therefore, can be adapted to a portable saw.

The machines of the present invention require only a light mounting and take up a minimum amount of space. Therefore, they may be conveniently placed directly upon the workman's bench; this results in greater efficiency and also saves floor space. The machines are automatic in operation and have an adjustable feed mechanism incorporated in the driving assembly so as to feed the saw according to the hardness of the material being cut.

It has, therefore, been an object of the present inventor to provide a simplified, power driven hack saw or file, that is a compact, self-contained unit of inexpensive structure, suitable for convenient use upon a workbench or table.

It has been another object to provide an improved automatic power driven hack saw or file having a novel saw or file driving mechanism and feeding arrangement.

It has been a further object of the inventor to provide a portable hack saw incorporating a unitary drive mechanism and motor assembly which can be conveniently carried about and applied to the work wherever it is needed.

It has been a further object of the invention to provide a power driven hack saw or file assembly, in which the driving torque of the motor imparts an angular or feeding thrust to the saw assembly during the cutting stroke and releases the thrust on the return stroke of the saw.

Other objects and advantages will be more fully apparent from a description of the accompanying drawings, in which:

Figure 9 is a front view of a portable type of hack saw incorporating the present invention.

Figure 10 is a back view of the portable saw of Figure 9, a portion of the view being broken away for illustrating certain of the driving gears.

Figure 11 is a sectional view taken on line 11—11, Figure 10, illustrating the driving mechanism for the saw frame.

Figure 12 is a longitudinal sectional view of a power driven hack saw incorporating the present invention, including a feeding device.

Figure 13 is a sectional view taken on line 13—13, Figure 12.

Figure 14 is a view taken on line 14—14, Figure 13, illustrating the details of the feeding mechanism.

Figure 15 is a top plan view of the apparatus further illustrating the feeding mechanism, particularly the adjustment means therefor.

Figure 1:
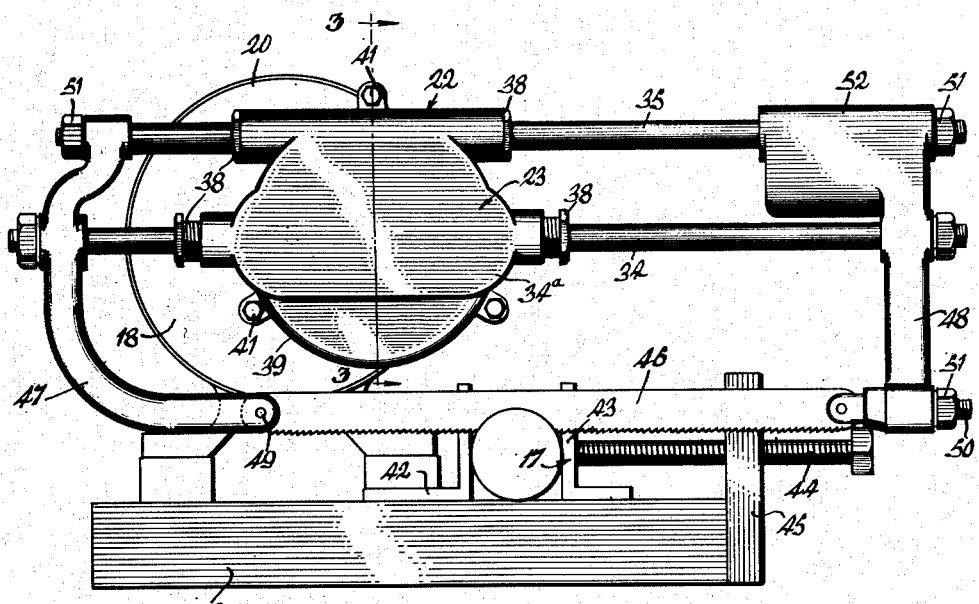
Figure 1 is a front view of the power driven hack saw of this invention illustrating the type adapted to be mounted on the workbench.
Figure 2:
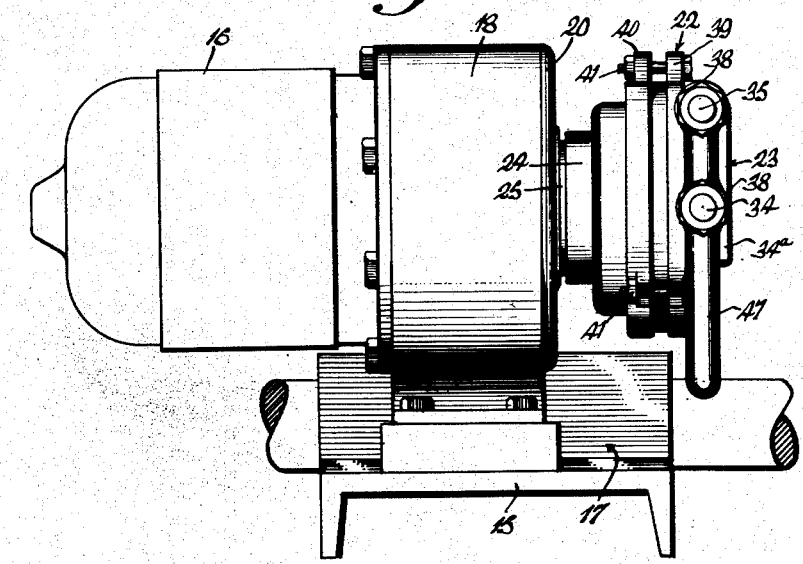
Figure 2 is an end view thereof.
Figures 3, 4:
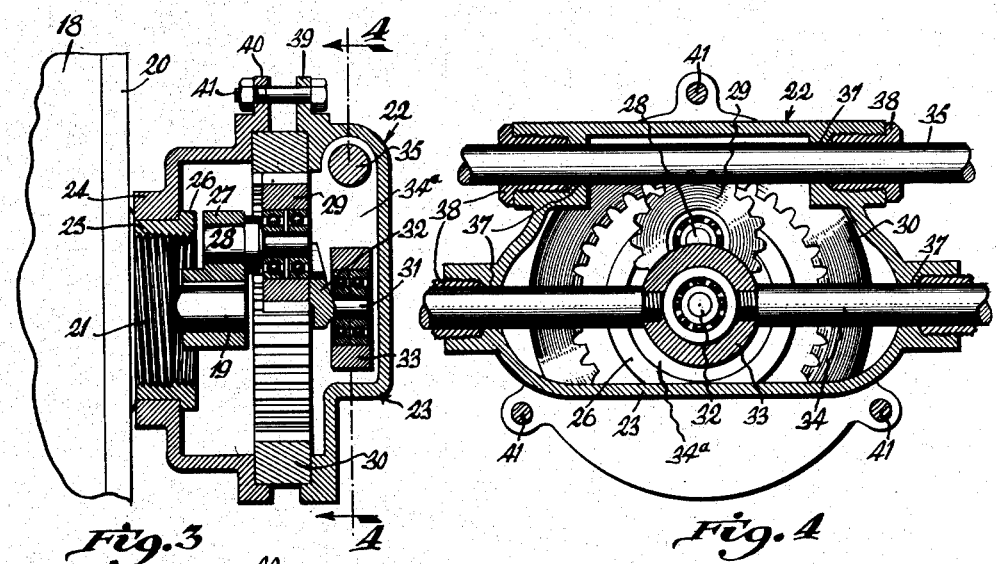
Figure 3 is a sectional view taken on line 3—3, Figure 1, illustrating the driving mechanism of the hack saw frame.
Figure 4 is a sectional view taken on line 4—4, Figure 3, illustrating the connection of the driving mechanism to the hack saw frame.

Referring to Figures 1 and 2 of the drawings illustrating the bench mounted hack saw, a base is indicated at 15 on which are secured the driving motor 16 and a work clamping fixture 17. The forward or driven end of the motor includes a reduction gear unit 18 for reducing the speed of the output shaft 19 of the power unit and increasing the driving torque. This structure is of conventional design and, therefore, is not more completely illustrated.

The cover plate 20 on the forward end of the gear unit includes a boss 21 providing a bearing for the output or drive shaft 19. This boss also provides a bearing support for loosely, relatively mounting the hack saw driving head 22.

The hack saw driving head comprises a housing 23 which encloses the driving mechanism for reciprocating the saw frame which is slidingly sustained therethrough and connected to the driving mechanism. The driving head casing includes a bearing hub 24 which is loosely journalled on a journal sleeve 25 screwthreaded on the boss 21 of the reduction gear casing. The sleeve 25 includes an annular flange 26 about its outer edge which serves to retain the head against lateral displacement.

From the foregoing, it will be seen that the driving head and saw frame assembly is free to swing in an arc about the center of the bearing arrangement provided between the driving head and the power unit. In this manner, provision is made for feeding movement of the saw frame, which extends outwardly, radially from the head.

Briefly, therefore, it may be said that the machine incorporates a stationary power unit and a power head and saw frame unit in rocking relationship with the power unit. Since this saw frame is in reciprocating relationship with the driving head, it accomplishes the sawing and feeding motions necessary in cutting.

The driving mechanism for reciprocating the saw frame is located within the head and consists of a compact arrangement designed to occupy very little space. The output, or drive shaft, 19 extends inwardly of the driving head and centrally of the hub 21. A crank arm 27 having a crank pin 28 is keyed or otherwise secured on the outer end of the shaft 19. The crank pin carries a planetary gear 29 loosely journalled thereon and in mesh with a stationary internal gear 30. The planetary gear 29 carries a secondary crank pin 31 secured on the outer face thereof by means of an attaching plate 32 attached to the gear 29 by welding or other means. The crank pin 31 reciprocates in a straight line when the main drive shaft 19 is rotated and is in driving connection with the saw frame as will be subsequently described.

The driving apparatus operates in the following manner. The internal gear 30 is secured to the driving head against rotation and is located concentrically relative to the main drive shaft 19, that is, the pitch circle of the internal teeth may be considered as described on a center coinciding with the center of the shaft 19. The crank arm 27 secured on the shaft and carrying the main crank pin 28 disposes the center of this pin on a radius of exactly one-half the radius of the pitch circle of the internal gear. The planetary gear 29, being located on this pin and in mesh with the stationary internal or sun gear, necessarily has a pitch circle of exactly one-half the diameter of the pitch circle of the internal gear, that is, the pitch diameter of the planetary gear is equal to the radius of the pitch circle of the internal gear.

The secondary crank pin 31 secured on the planetary gear 29 has its center located directly on the pitch circle of that gear. When the drive shaft 19 is rotated, the main crank pin 28 carries the planetary gear in an orbit within the internal gear and, since the two gears are in mesh, results in a rolling circular or epicycloidal motion of the planetary gear.

Figure 5:
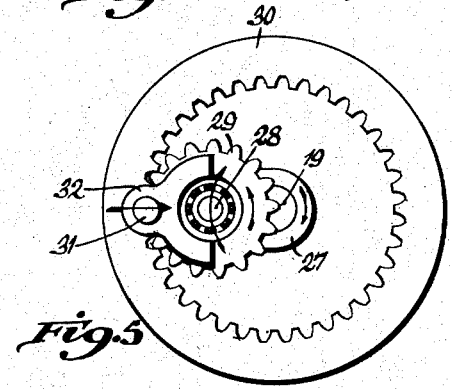
Figure 5 is a view illustrating the planetary gear in position on the stationary gear at the end of the reciprocal motion of the saw frame in one direction.
Figure 6:
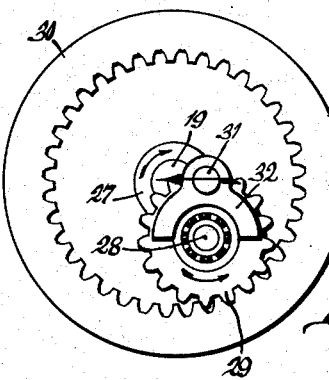
Figure 6 is a view taken similar to Figure 5, but illustrating the planetary gear toward the other end of its stroke.

In describing its orbit (see Figures 5 and 6) the planetary gear rotates on the crank pin in a direction opposite to that of its bodily orbital motion and makes one-half of a revolution to one-half of the orbital circle. Thus, the secondary crank pin 31, located on the pitch circle of the planetary gear, is actuated by the resultant of the combined rolling and orbital motion of the gear and travels in a straight line across the diameter of the internal gear. Therefore the crank pin completes a stroke in one direction to a half revolution of the drive shaft 19 and the return stroke on the second half revolution, thus making one complete reciprocation or a forward and return stroke to each revolution of the drive shaft 19.

The saw frame is placed in driving connection with the reciprocating crank pin 31 by means of the bearing yoke 33 and driving rod 34. The yoke is attached to the driving rod medially of its length by screw threading or other fastening means, and the opposite ends of the rod extend outwardly and in connection with the saw frame. The casing of the driving head includes a compartment 34a for accommodating the yoke and rod assembly and an upper frame bearing rod 35. The compartment 34 includes slide bearings 37 on opposite ends, through which the rods 34 and 35 slidingly extend and traverse the casing, each rod being sustained at opposite ends of the compartment. The bearings 37 may include packing glands, as indicated at 38, to insure against leakage of oil from the interior of the casing.

The casing is fabricated in two sections, a front section 39, which includes the compartment 34, and a rear section 40, which includes the bearing hub 24 for mounting on the power unit. This construction facilitates assembly of the parts, the two sections being secured together by means of screws 41. The internal gear 30 is disposed between the two sections and is rigidly clamped in place by the screws 41.

The work clamping fixture is mounted on the base 15 of the saw and to one side of the driving head. The fixture may be of any clamp structure suited to the particular variety of work to be cut. As illustrated, it is comprised of a pair of angle iron jaws 42 and 43. The movable jaw 43 is operated by a clamping screw 44, screw-threaded through a bar element 45 attached to the base 15.

The saw frame extends outwardly of the driving head and has its major portion projected to the side on which the clamp fixture is located. The arrangement provides that the cutting area of the hack saw blade 46 engages the work approximately medially of its length.

The saw blade or the file is drawn tightly between the two end members 47 and 48 of the saw frame and is engaged by a pin 49 of the member 47 on one end and by a draw bolt 50 of the member 48 on the opposite end in the usual manner. The upper extremities of the end members are secured to the bearing rod and held in place by means of the nuts 51. The intermediate or driving rod 34 is therefore under compressive forces, while the saw blade and the bearing rod are under-tension, thereby constituting an extremely rigid structure.

It will be evident from the foregoing that the saw frame and driving head assembly, being loosely mounted, will permit the saw frame to exert a feeding pressure by gravity because of overhang of the frame beyond the work. In addition, the outer frame member 48 may be provided with a weighted portion 52, as illustrated, to supplement the load, the weight of the frame being concentrated on the blade along the line of cutting contact with the work.

From the construction of the frame driving mechanism it will be apparent that the driving torque of the power unit, in reciprocating the saw frame, will tend to revolve the head in the direction of rotation of the power shaft. This tendency is due to the reaction of the pinion 29 against the internal gear 30; in other words, the resistance of the saw frame is transmitted to the pinion causing it to set up a resistance against rotation. The resistance of the pinion tends to revolve the internal gear in the direction of the orbital motion of the pinion. Since the pinion is attached to the driving head, the force generated is applied to the head and to the saw frame.

The condition thus set up is ideal for the cutting operation of the saw because the cutting and feeding forces are balanced against each other, the feeding force or thrust being automatically proportioned by the resistance of the cutting stroke of the saw blade. Thus, an efficiency in power consumption is effected, since, as a hack saw cuts only in one direction, the blade automatically is freed during the return stroke so as to escape being dragged across the cut with the consequent waste of power and heating which ordinarily would occur. Moreover, it is a known fact that hack saw blades are quickly dulled if drawn across the work in a direction reverse to that of the cutting direction because of the buttressed, or angularly inclined, rear faces of the cutting teeth.

In the arrangement shown in the drawings, the drive shaft of the power unit rotates in a clockwise direction, or toward the work, in order to develop the feeding thrust downwardly upon the work. The hack saw blade is shown in the drawings with the cutting teeth facing the driving head so as to cut during the return or draw stroke, although the machine will operate equally well with the blade cutting in the opposite direction.

Since the machine automatically develops a feeding pressure generated by the resistance of the saw blade in the cutting stroke, the direction in which the blade is arranged is immaterial. The length of stroke of the blade is less than half its total length and is limited to an area between its center and an outer end. As the blade becomes dulled it can readily be reversed or turned end for end, thus bringing into action the other, or unused, portion of the blade. The reversal of the cutting direction will then be accommodated by the machine in the manner previously described, and, thus, the entire blade may be utilized with the result of considerably greater service.

Figure 7:
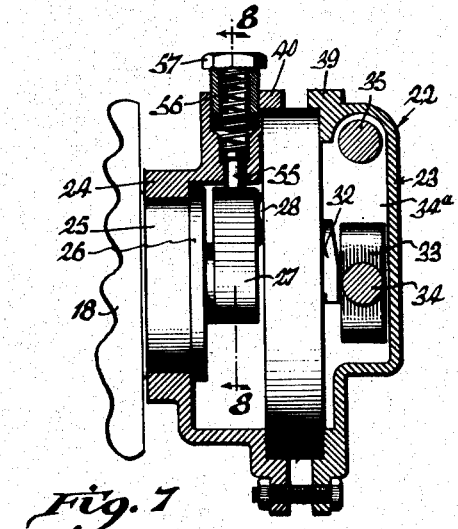
Figure 7 is a sectional view taken similar to Figure 3, but illustrating a friction feed device incorporated in the structure of Figure 3.
Figure 8:
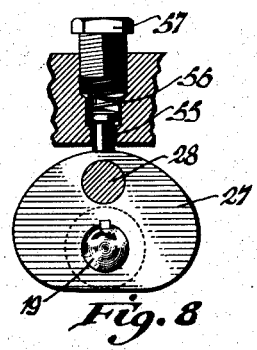
Figure 8 is a sectional view taken on line 8—8, Figure 7, further detailing the friction feed device.

A friction feed device is illustrated in Figures 7 and 8. This structure shown is the same as that described above except that the crank arm 27 is in the shape of a cam. A friction device, consisting of a headed pin 55 slidably mounted in the driving head casing, engages this cam. The shank end of the pin is held against the cam periphery for the purpose of causing a frictional engagement with the periphery of the cam by means of a coil spring 56 disposed under compression against the head of the pin. This spring is held in place by means of an adjusting nut 57 screwed into the bore which contains the pin. The engagement of the head of the pin with the shoulder of the bore limits the inward movement of the pin.

The cam is contoured so as to engage the pin throughout the feeding stroke of the saw. This, it will be observed, is a matter of arranging the surface of the cam relative to the crank pin 28 and driving shaft 19. The result is that rotation of the cam revolving the crank pin tends to rotate the entire mechanism about the axis of the crank shaft, thereby causing feeding pressure in the cutting stroke of the saw.

The apparatus illustrated in Figures 9 to 11 inclusive, embodies the same general concepts as heretofore described except that the device is more portable. This form of the invention is not designated to rest upon the workbench but is more truly portable in that a handle is provided for carrying the device and holding it in position upon the work. The apparatus embraces a motor 65 incorporating a handle 66 at one end and a speed reduction unit 67 at the other end. The speed reduction unit, as shown in Figure 10, includes a worm 68 and worm wheel 69, which is keyed upon a driving shaft 70. As illustrated in Figure 11, the driving shaft is journaled in bearings 71 and 72 at each side of the worm wheel. The crank arm 73 is keyed to the driving shaft and includes a crank pin 74 carrying and revolving the planetary gear. The balance of the driving mechanism is the same as in the preceding form.

A fixture 75 is provided for locating the device on the work 76. This fixture consists of an inverted channel iron element 77 carried on slide rods 78, one of which is located at each side of the transmission casing of the unit 67. These rods 78 slide within lugs 79 at each side of the casing. Coil springs 80 are disposed, under compression, between the channel iron element and the lugs 79, tending to hold the fixture outwardly and rendering it yieldably depressible, so that the saw is normally withheld from the work by the springs. During the cutting stroke of the saw the operator bears downwardly in order to feed the blade into the work and releases during the draw stroke, so as to free the blade. Apart from minor variations in the shape of the driving head casing, such as the bearing extensions 81—81, the reciprocating unit carrying the saw blade is mounted in the same manner as in the preceding form. No further description is believed requisite.

In Figures 12 to 15 inclusive, an automatic feeding mechanism adaptable for causing uniform feed of the saw into the work is disclosed. The driving unit of this apparatus, with respect to the driving crank arm and the planetary gear arrangement, is the same as previously described.

The cover plate on the forward end of the gear unit includes a circular boss 85. The driving shaft 19 extends axially from this boss as described heretofore. A portion of the casing of the driving unit, however, is rigidly secured in position, and this portion carries an adjusting worm gear wheel 86. The section referred to is the back casing element 87 which includes a hub fastened upon the bearing hub 85 by means of a set screw 88. This casing section is further provided with an inwardly projected annular flange 89.

The fixed worm gear wheel 86 is secured upon the inner end of this flange including an annular groove adapting the gear to be engaged over the flange and secured thereon by screws 90. The gear 86 is further annularly grooved to provide an overhanging lip 91 engaged over the shoulder provided by a circumferential groove 92 in the periphery of the stationary internal gear 30.

The internal, stationary in use, gear is rotatably adjustably journaled within the back casing element 87 and is fixed to the forward casing section 93 by means of screws 94. The cylindrical portion 95 of the outer casing overhangs the outwardly projected flange 96 of the back casing section, thus providing a chamber for the gear 86. The gear 30 of the driving system is adjustably fixed in position and is adjusted by means of a worm 97 carried by the outer casing element 95 (see Figure 14). Thus, its function in the driving train, which is dependent upon its being stationary, is not disturbed. However, the driving head, which consists of the casing section 95 and the parts carried thereby, may be adjusted rotatably for swinging the saw blade into or away from the work.

The worm 97 is fixed to an adjustment shaft 98 extending upwardly and projecting from the top of the casing 95. An adjusting hand wheel 99 is secured on the projecting end of the shaft 98. An eccentric bushing 100 journals the adjusting shaft. This bushing is adjustable by means of a finger 101 projecting radially therefrom and operable in the slot 102 in the casing wall. Since the shaft is eccentrically mounted in the bushing, the result of rotation is to swing the worm out of mesh with the stationary gear and thus permit free rotation of the driving head. The worm is supported upon a contact screw 103 disposed through the casing wall and engaging the worm axially.

Automatic adjustment of the worm is procured through a feeding unit and a lifting unit consisting, in each instance, of the following parts: a ratchet wheel 104 is keyed to the shaft and is rotated by means of a lever 105, providing one arm 106, carrying a pawl 107 normally urged against the ratchet by means of a spring arm 108, anchored upon a pin 109 on the end of the arm. Each lever provides another arm 110 which is the actuating arm adapted to be engaged by elements carried by the driving head or the saw frame. These units operate in reverse directions.

For the purpose of operating the feeding lever, a stud 111 is carried by the saw frame and engages its particular lever at the end of the return stroke of the saw. The raising lever is actuated by a translatable rod 112 slidably journalled in the driving head and operated by a dog 113 pinned upon the upper support rod of the saw frame. The rod 112 is yieldably depressibly mounted including for this purpose a coil spring disposed around the rod within the casing between the casing wall and shoulder 114 on the rod, normally holding the rod in fully retracted position.

The upper ratchet is the feeding means and is arranged for turning the worm wheel a variable amount upon each reciprocation of the saw frame. The progressive feed is obtained by varying the amount of movement of the feed ratchet, which is the upper one. In other words, the amount of feed is the difference between the lift ratchet movement and the feed ratchet movement. This difference is varied by means of an adjustable stop bracket 117 loosely rotatably mounted about the axis of the worm shaft. This bracket carries a detent 118 engageable in any one of a series of detent apertures 119 in the top surface of the casing. The detent includes a hand wheel 120 for raising and lowering the same and swinging the bracket, and a pointer 121 adapted to register with any one of a series of graduations arranged in an arc on the casing top surface. The bracket carries a stop pin 122 engageable with the pawl of the top ratchet. The stop pin 123 for the other pawl is fixed in a lug 124 of the casing 95. The pawl carrying levers of the ratchet units are returned to position against the respective stop pins by means of springs 125 and upon engagement with the pin the pawl is disengaged from the ratchet. The operation of the unit is as follows: If the operator desires to rotate the saw head freely, the worm may be swung out of mesh with the gear by rotating eccentric bushing through the finger 101. If manual feeds are desired, the worm is left in mesh, and the hand wheel 99 is operated as desired, thus tending to rotate the saw frame and driving head about the driving axis.

With the levers in normal positions, that is, pawls disengaged, the hand wheel may be turned either to the right or left for placing the saw at a feed starting position. The cycle of feeding and lifting operations is as follows:

Toward the end of the return stroke, as shown in Figure 15, the stud 111 is engaged against the feed ratchet lever 105. This engagement turns the worm with respect to the fixed worm wheel and causes rotation of the entire saw head about the worm wheel in an angular position in the same plane as the saw blade. This feeds the blade into the cut during the cutting stroke by an amount varied through setting of the adjustable bracket 117. At the end of the cutting stroke the dog 113 actuates the lever of the lifting ratchet through the medium of the translatable plunger 112 and operates the ratchet a fixed amount, thus raising the saw blade for the return stroke.

It is apparent that the feed is obtained by turning the feed ratchet through a greater arc than the lift ratchet, the amount being varied by adjustment of the bracket 117. It is, of course, obvious that a hand feed may be used entirely by the elimination of the ratchets and levers or by rendering them inoperative.

Having described my invention, I claim:

1. A power driven hack saw, comprising, a power device, a hack saw frame including a hack saw blade, means for mounting said hack saw for reciprocatory motion, a transmission between said power device and said hack saw frame including a crank arm, a planetary gear carried by the crank pin of the crank arm, a gear meshing with the planetary gear fixed in relation to the hack saw frame, and a crank pin on the planetary gear, said last named crank pin engaged with the saw frame for reciprocating said frame.

2. A power driven hack saw, comprising, a power means, a driving head rotatably mounted on said power means, a saw frame slidably mounted in said driving head in a plane at right angles to the plane of the axis of the driving head, a crank arm driven by said driving means within said head, the crank pin of the crank arm carrying a planetary gear, an internal gear fixed within the head in mesh with said planetary gear, and a crank arm carried by said planetary gear including a crank pin disposed on the axis of rotation of the first named crank arm, said crank pin having a connection to the saw frame within the driving head, the pitch circle of the planetary gear being of the same dimension as the radius of the pitch circle of the internal gear.

3. A power driven hack saw, comprising, a motor, a transmission mechanism for converting rotary into lineal motion, a driving head rotatably mounted on said motor for housing said transmission mechanism, a hack saw frame reciprocably mounted cross-wise in said driving head and connected to said transmission mechanism for receiving the lineal motion, and a device for feeding the hack saw into the work, consisting of means for rotating the driving head about the axis of the driving unit in fixed degrees and upon each reciprocation of the frame.

4. A portable power driven apparatus, comprising, a motor having a handle on one end and means for converting rotary into lineal motion on the other end, a frame driven by said means in reciprocatory motion, said frame carrying a hack saw or the like, and a fixture extending from said motor consisting of a channel shaped element depressibly mounted and engageable with the work, said element constructed and arranged so as to depress as the hack saw is fed through the work.

5. A power driven hack saw, comprising, a power device, a hack saw frame including a hack saw, a rotatably mounted head mounting said hack saw on said power device for reciprocatory motion, a transmission between said power device and said hack saw frame including a crank arm, a planetary gear carried by the crank pin of the crank arm, an internal gear fixed in relation to the hack saw frame, the pitch diameter of said planetary gear being equal to half the pitch diameter of the internal gear, and a crank pin on the planetary gear, said last named crank pin disposed on the axis of rotation of the crank arm engaged with the saw frame for reciprocating same.

6. A power driven hack saw, comprising, a motor, a transmission mechanism for converting rotary into lineal motion, a driving head rotatably mounted on said motor for housing said transmission mechanism, a hack saw frame reciprocably mounted cross-wise in said driving head and connected to said transmission mechanism for receiving the lineal motion, and a device for feeding the hack saw into the work.

7. A portable power driven hack saw, comprising, a power unit having a handle on one end and a transmission on the other end, a driving head extending laterally from said transmission, a hack saw frame, including a blade, reciprocably mounted in said head parallel with the axis of the power unit, said blade adapted to engage the work substantially medially of the length of the power unit and transmission assembly, and driving means connecting the transmission to the saw frame, including means for converting rotary motion into reciprocatory motion.

8. A power driven hack saw, comprising, a power source, a driving head rotatably mounted on the power source, a saw frame, including a blade, reciprocably mounted in said driving head, a transmission extending from said power source to said saw frame for reciprocating the same, a gear fixed with respect to said power source, a worm gear engaging with said last named gear and rotatably mounted in the driving head adapted upon rotation to rotate said head, and means for adjusting said worm gear for changing the angular position of the saw frame with respect to the axis of rotation of the driving head.

9. A power driven hack saw, comprising, a power source, a driving head rotatably mounted on the power source, a saw frame including a blade reciprocably mounted in said driving head, a transmission extending from said power source to said saw frame for reciprocating the same, a gear fixed with respect to said power source, a worm gear engaging with said last named gear rotatably mounted in the driving head adapted upon rotation to rotate said head, a wheel for adjusting said worm gear, a lifting ratchet fixed to the worm gear, a feeding ratchet fixed to the worm gear, pawl levers for actuating the respective ratchets, actuating elements on the saw frame adapted to engage the ratchet levers in respective directions of movement of the saw frame for automatically rotating the driving head for feeding or lifting the saw relative to the work, and means on the feeding ratchet for varying its movement.

10. A power driven hack saw, comprising, a power unit, a driving head rotatably mounted on the power unit, a saw frame including a blade reciprocably mounted in said driving head, a transmission extending from said power source to said saw frame for reciprocating the same, a gear fixed with respect to said power source, an adjustable worm gear engaging with said last named gear rotatably mounted in the driving head adapted upon rotation to rotate said head, pawl and ratchet mechanisms, actuating elements on the saw frame adapted to engage the pawl and ratchet mechanisms for the respective directions of movement of the saw frame for automatically rotating the driving head and feeding or lifting the saw relative to the work.

11. A portable power driven hack saw comprising a motor, including a handle at one end and a driving head at the other end, a hack saw blade or the like, a frame for said hack saw blade, said frame reciprocably mounted in said driving head, said driving head extending laterally and said hack saw frame disposed longitudinally alongside of said motor with the saw blade extending substantially the length of the driving head and motor.

EDWARD J. PAQUE.